United States Patent [19]

Andrews

[11] Patent Number: 5,028,063
[45] Date of Patent: Jul. 2, 1991

[54] FOLDING STEP SYSTEM

[76] Inventor: Dean D. Andrews, 1925 SW. Tara, Topeka, Kans. 66611

[21] Appl. No.: 497,479

[22] Filed: Mar. 21, 1990

[51] Int. Cl.$^5$ .............................................. B60R 19/00
[52] U.S. Cl. ..................................... 280/166; 182/97; 296/62
[58] Field of Search ................... 280/163, 164.1, 166; 162/91, 97, 106, 108; 296/62

[56] References Cited

U.S. PATENT DOCUMENTS

| 560,752 | 5/1896 | Prator | 296/62 |
|---|---|---|---|
| 3,606,382 | 9/1971 | Pollock | 280/166 |
| 3,853,369 | 12/1974 | Holden | 296/62 |
| 3,858,905 | 1/1975 | Peebles | 280/163 |
| 4,191,388 | 3/1980 | Barksdale | 296/62 |
| 4,527,941 | 7/1985 | Archer | 414/537 |
| 4,757,876 | 7/1988 | Peacock | 182/95 |
| 4,795,304 | 1/1989 | Dudley | 414/537 |
| 4,813,842 | 3/1989 | Morton | 414/557 |

Primary Examiner—Andres Kashnikow
Assistant Examiner—Richard Camby
Attorney, Agent, or Firm—Litman, McMahon & Brown

[57] ABSTRACT

A folding step system includes a base assembly with approximate and distal ends, a link assembly with base and step ends, and a step assembly with approximate and distal ends. A base hinge assembly hingedly connects the base proximate end and the link assembly base end for rotational movement about a transverse rotational axis through an arc of movement between a retracted position adjacent to the base assembly and an extended position extending from the proximate end thereof. A step hinge assembly hingedly connects the link assembly distal end and the step proximate end for rotational movement about a transverse rotational axis between a retracted position adjacent to the link assembly and an extended position extending from the step end thereof.

18 Claims, 2 Drawing Sheets

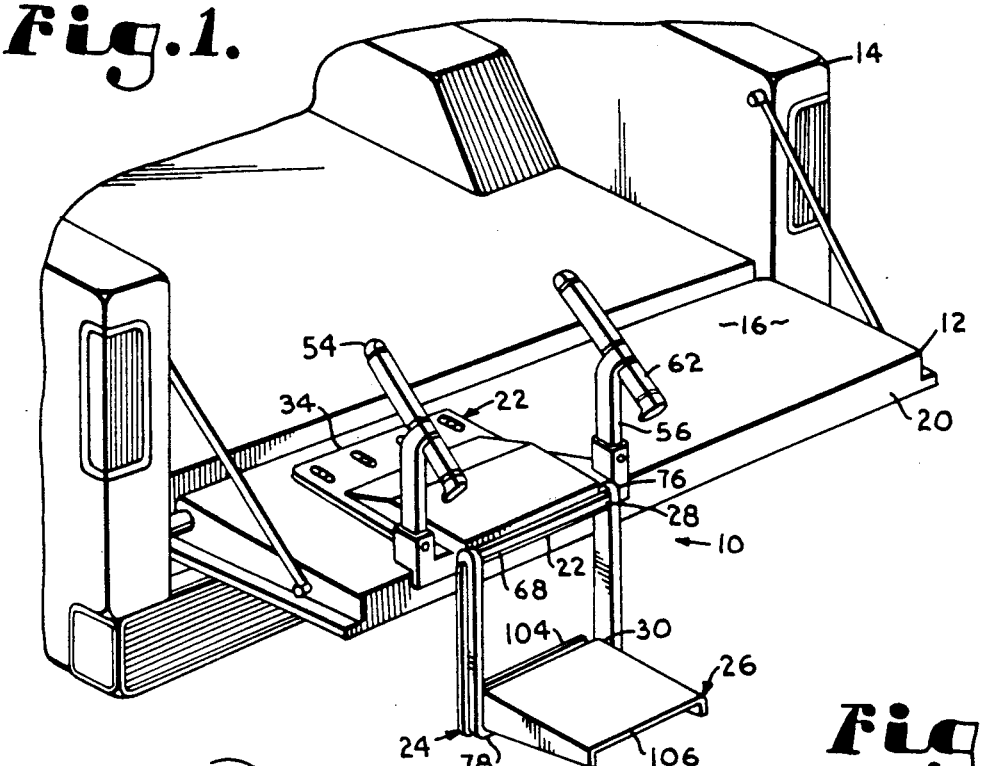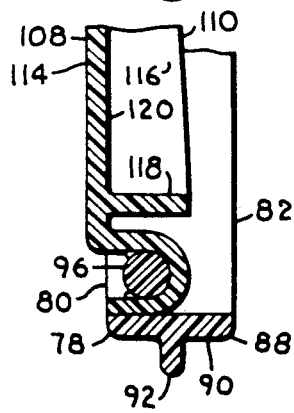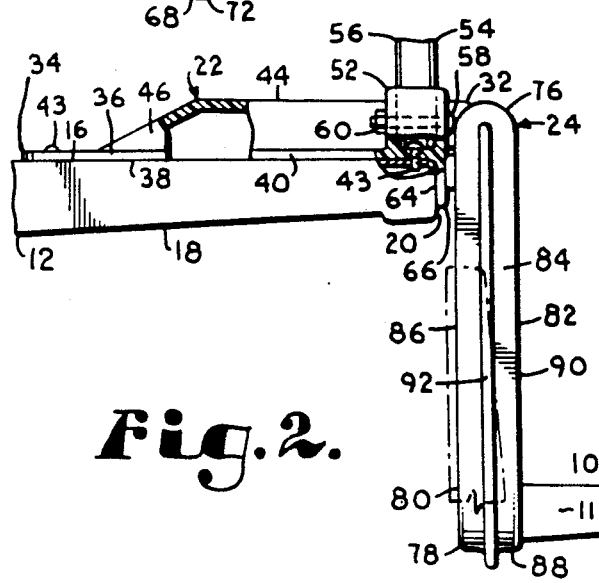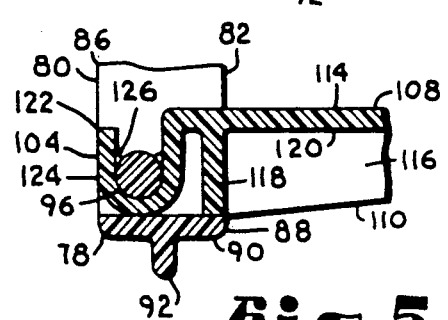

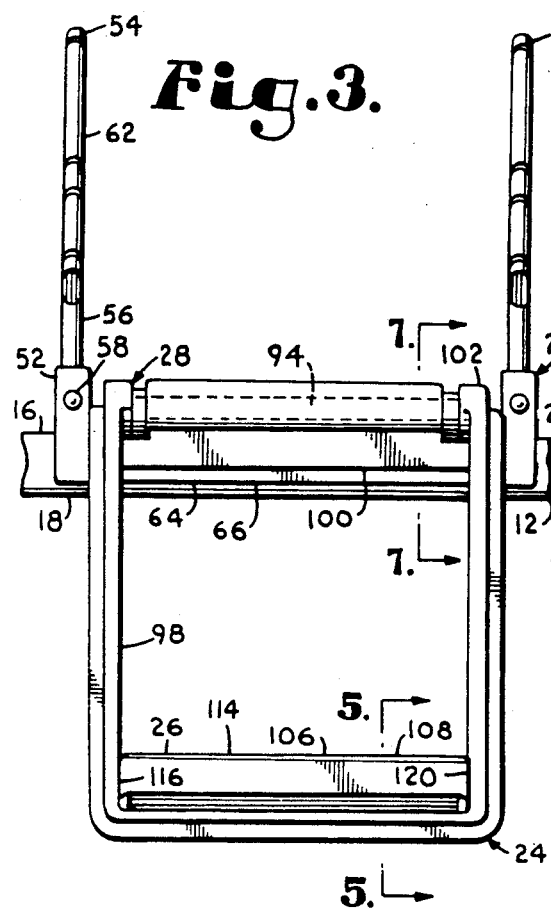
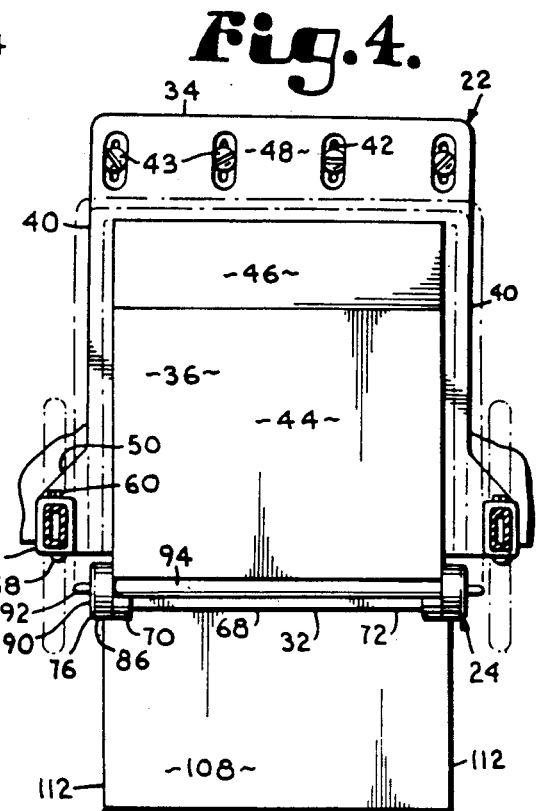
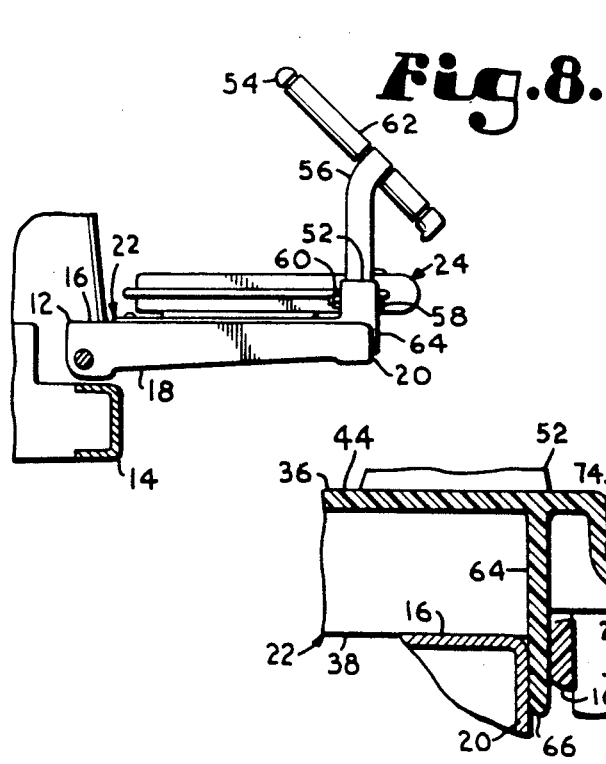
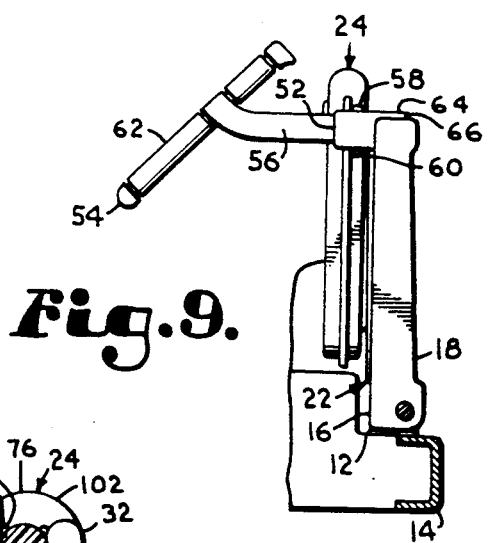

5,028,063

FOLDING STEP SYSTEM

BACKGROUND OF THE INVENTION

1. Field of the Invention

The present invention relates generally to climbing devices, in particular to a folding step system, and more particularly to a folding step system for mounting on the tailgate of a pickup truck.

2. Description of the Related Art

Various climbing devices, such as steps, ladders and ramps, are commonly used for ascending and descending. For example, the beds of pickup trucks are typically elevated to heights which make them difficult or awkward to step into directly from a ground surface. This inconvenience is exasercbated when a load must be carried for deposit into or removal from a pickup truck bed.

Animals can also have difficulty ascending into or descending from pickup truck beds. For example, dogs sometimes sustain injuries to their legs by leaping towards the open back ends of the pickup truck beds and striking the open tailgates. The risks of such injuries can be greater when the pickup truck and the ground surface are slippery from precipitation, mud, etc.

These problems have previously been addressed by providing pickup trucks with folding ramps, ladders and steps. Examples of such devices are disclosed in the Pollock U.S. Pat. No. 3,606,382; the Holden U.S. Pat. No. 3,853,369; the Archer U.S. Pat. No. 4,527,941; the Peacock U.S. Pat. No. 4,757,876; the Dundley U.S. Pat. No. 4,795,304; and the Morton U.S. Pat. No. 4,813,842. However, none of these devices includes the advantages and features of the present invention.

SUMMARY OF THE INVENTION

In the practice of the present invention, a folding step system is provided which includes a base assembly with proximate and distal ends and upper and lower surfaces. A link assembly includes a base end, a step end and a transversely-spaced pair of longitudinal members extending between the link assembly ends. A step assembly includes proximate and distal ends. A base hinge mechanism rotatably interconnects the base proximate end and the link base end for rotation of the link assembly through a rotational arc of movement between a retracted position adjacent to the base assembly and an extended position extending from the base proximate end. A step hinge mechanism rotatably interconnects the link assembly step end and the step assembly proximate end for rotation of the step assembly through an arc of movement between a retracted position adjacent to the link assembly and an extended position extending from the link step end. The base assembly is adapted for mounting on a pickup truck tailgate. With the link assembly and the step assembly in their retracted positions, the folding step system can be stored compactly against the inside face of the pickup truck tailgate. With the tailgate folded down and the link and step assemblies in their respective extended positions, a step is provided for ascending into and descending from the pickup truck bed.

OBJECTS AND ADVANTAGES OF THE INVENTION

The principal objects and advantages of the present invention include: providing a folding step system; providing a folding step system which is adapted for mounting on pickup truck tailgates; providing a folding step system which is foldable to a relatively compact configuration; providing a folding step system which can be relatively lightweight; providing a folding step system which interferes relatively little with the operation of the tailgate; providing a folding step system which is relatively strong; providing a folding step system which can be relatively easily mounted on a pickup truck tailgate with relatively minor modifications thereto; providing a folding step system which is adaptable to a variety of pickup trucks; providing a folding step system which can be constructed primarily of plastic materials; providing a folding step system which is economical to manufacture, efficient in operation, capable of a long operating life and particularly well-adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top, rear, left side perspective view of a folding step system embodying the present invention, shown mounted on a pickup truck tailgate.

FIG. 2 is an enlarged, fragmentary, left side elevational view of the folding step system.

FIG. 3 is a rear elevational view of the folding step system.

FIG. 4 is a top plain view of the folding step system.

FIG. 5 is an enlarged, fragmentary, cross-sectional view of the folding step system taken generally along line 5—5 in FIG. 3, with a step assembly shown in an extended position thereof.

FIG. 6 is an enlarged, fragmentary, vertical, cross-sectional view of the folding step system similar to the view shown in FIG. 5, except that the step assembly is shown in a retracted position thereof.

FIG. 7 is an enlarged, fragmentary, vertical, cross-sectional view of the folding step system, taken generally along line 7—7 in FIG. 3 and particularly showing a base hinge mechanism with a link assembly in an extended position thereof.

FIG. 8 is a left side elevational view of the folding step system, showing the step assembly and the link assembly in their retracted positions with the tailgate folded down.

FIG. 9 is a left side elevational view of the folding step system, showing the step assembly and the link assembly in their retracted positions with the tailgate folded up.

FIG. 10 is a top, rear, left side, exploded perspective view of the folding step system, particularly showing the right side of the base hinge mechanism.

DETAILED DESCRIPTION OF THE PREFERRED EMBODIMENT

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly"0 will refer to directions toward and away from, respectively, the geometric center of the structure being referred to. Said terminology will include the words specifically mentioned, derivatives thereof and words of similar import.

Referring to the drawings in more detail, the reference number 10 generally designates a folding step system embodying the present invention. Without limitation on the generality of useful applications of the folding step system 10, it can be mounted on the folding tailgate 12 of a pickup truck 14, the tailgate 12 having an inner face 16, an outer face 18 and a end edge 20.

The folding step system 10 generally includes a base assembly 22, a link assembly 24 and a step assembly 26, which are interconnected by a base hinge mechanism 28 and a step hinge mechanism 30.

II. Base Assembly 22

The base assembly 22 includes proximate and distal ends 32, 34, upper and lower surfaces 36, 38, and opposite sides 40. A plurality (e.g. four are shown) of reinforced slots 42 are located in transversely-spaced relation adjacent the distal end 34 and are adapted to receive suitable mechanical fasteners, for example "Staysert" fasteners for attachment to the tailgate inner face 16.

The base upper surface 36 includes a raised interior portion 44 with a sloping transition section 46, and a lower, relatively flat perimeter portion 48 which surrounds the raised interior portion 44 adjacent to the distal end 34 and the opposite sides 40. The perimeter portion 48 includes a pair of wings 50 which project laterally outwardly at the opposite sides 40 and mount sockets 52 projecting upwardly therefrom. Each socket 52 is adapted to receive a handrail subassembly 54 including a support post or baluster 56 secured at its lower end in the socket 52 by a bolt 58 and a nut 60, and a railing or balustrade 62 mounted on an upper end of the support post or baluster 56. The railing or balustrade 62 preferably slopes at a convenient angle upwardly from back-to-front with the tailgate 12 folded down, as shown in FIGS. 1 and 8.

The base raised portion 44 terminates at a proximate wall 4 which extends beyond the base inner surface 38 to a free edge 66. A trough subassembly 68 is formed at the base proximate end 32 and includes a pair of hooks 70 located at opposite sides of the raised portion 44 with an upwardly-open channel member 72 extending transversely therebetween and including projections 74 extending inwardly thereinto.

III. Link Assembly 24

The link assembly 24 includes a base end 76, a step end 78, first and second faces 80, 82 and opposite sides 84. A pair of longitudinal link members 86 extend longitudinally between the ends 76, 78 and are interconnected at the step end 78 by a transversely-extending step end member 88. The members 86, 88 have T-shaped cross-sectional configurations (FIGS. 4, 5 and 6) with inner webs 90 and flanges 92 extending outwardly therefrom.

A base end rodmember 94 extends transversely between the longitudinal link members 86 at the base end 76, and a step end rod member 96 extends transversely across the step end 78 between the link members 86 in parallel, spaced relation with respect to the step end member 88. A link assembly opening 98 is framed by the longitudinal link members 86 and the rod members 94, 96.

A link crossbar or stop member 100 extends transversely between the longitudinal link members 86 at the first face 80 in closely-spaced relation to the base end 76 of the step assembly 26.

Each longitudinal member 86 is connected to a respective base rod member 94 at a respective shoulder 102 (FIG. 8) projecting inwardly into the link assembly opening 98.

IV. Step Assembly 26

The step assembly 26 includes a proximate end 104, a distal end 106, a first face 108, a second face 110 and opposite sides 112. The step assembly 26 also includes a step panel 114 at its first face 108, side flanges 116 at its opposite sides 112, and a proximate end flange 118 at its proximate end 104, which partially enclose a cavity or hollow 120 which is open at the second face 110 and at the distal end 106.

A trough subassembly 122 extends transversely across the proximate end 104 and includes a channel member 124 in proximity to and substantially parallel to the proximate end flange 118. The step channel member 124 is open at the step first face 108 and has step channel projections 126 projecting thereinto.

The side flanges 116 taper or converge from the proximate end 104 to the distal end 106. The step panel 114 can be provided with an anti-slip texture or finish at the first face 108.

V. Base Hinge Mechanism 28

The base hinge mechanism 28 has a trunnion configuration and is formed by snapping the base rod number 94 past the projections 74 and into the base channel member 72. The link assembly 24 is rotatable about a transverse pivotal axis through an arc of movement of approximately 270 degrees between a retracted position (FIGS. 8 and 9) and an extended position (FIGS. 1, 4 and 7). The link assembly 24 is retained from rotating beyond its retracted position by engagement with the base assembly 22, and is retained from rotating beyond its extended position by engagement of the crossbar or stop 100 against the base proximate wall 64.

VI. Step Hinge Mechanism 30

The stephinge mechanism 30 has a trunnion configuration and is formed by snapping the step rod member 96 over the projections 126 and into the step channel member 124 (FIGS. 5-7). The step assembly 26 is thus rotatable about a transverse rotational axis through an arc of movement of approximately 90 degrees between a retracted position (FIG. 6 and phantom lines in FIG. 2) and an extended position (FIGS. 1, 3, 4 and 5 and solid lines in FIG. 2). Stop means is provided for retaining the step assembly 26 rotating beyond its retracted position and comprises the engagement of the step channel member 124 against the step end member 90. Stop means is also provided for retaining the step assembly 22 against rotation beyond its extended position and comprises engagement by the proximate end flange 118 against the web 90 of the step end member 88 (FIG. 5).

VII. Operation

In operation, the step system 10 is foldable between a retracted, storage position which permits the tailgate 12 to be lowered and raised (FIGS. 8 and 9 respectively) and an extended, use position (FIGS. 1-4). The folding and unfolding sequences involve two steps each, which steps involve the base and step hinge mechanisms 28, 30 respectively.

In the unfolding sequence, the tailgate is normally lowered as shown in FIGS. 1 and 8. The link assembly 24 is then swung from its retracted position adjacent to the base assembly 22 through a rotational arc of approximately 270 degrees to its extended position as shown in FIG. 2. The step assembly 26 is rotated through an arc of about 90 degrees from its retracted position (dashed lines in FIG. 2) to its extended position. The folding sequence involves substantially the same steps in reverse, with the step assembly 26 being first folded with respect to the link assembly 24, which is then folded with respect to the base assembly 22.

In its storage position, the folding step system 10 is relatively compact. In particular, the link longitudinal members 86 lie alongside the base raised interior portion 44. The link shoulders 102 space the longitudinal link members 86 slightly outwardly from the base raised interior portion 44 whereby the step side flanges 116 can be positioned therebetween when the step assembly 26 is folded.

Installation on the tailgate 12 is relatively easy and requires a minimum of modification to the pickup truck 14. Specifically, the tailgate 12 can be drilled for the mechanical fasteners 23 which extend through the slots 42 and also through the base assembly 22 in the sockets 52. The base assembly proximate wall 64 engages the tailgate edge 20.

With the folding step system 10 in its extended, use configuration, the link assembly opening 98 permits a clearance space for the foot of a person ascending or descending the folding step system 10. Furthermore, the handrail subassembly 54 can be grasped for assistance.

The step assembly 26 can be positioned at an appropriate angle in its extended, use position, for example with a slight, downward-and-forward slope to provide better footing for mounting the tailgate 12.

The folding step system 10 can be constructed of any suitable material, for example, plastic. Various high-strength plastics, including plastic available under the trademark "Lexan" from the General Electric Company can be utilized. A certain amount of resiliency or springiness in the plastic can facilitate ascending the folding step system 10 by boosting a person stepping on the step assembly 26 upwardly and onto the lowered tailgate 12.

It is to be understood that while certain forms of the present invention have been illustrated and described herein, it is not to be limited to the specific forms or arrangement of parts described and shown.

What is claimed and desired to be secured by Letters Patent is as follows:

1. A folding step system, which comprises:
 (a) base means including proximate and distal ends;
 (b) link means including base and step ends;
 (c) step means including proximate and distal ends;
 (d) base hinge means hingedly connecting said base proximate end and said link base end; and
 (e) step hinge means hingedly connecting said link step end and said step proximate end, said step hinge means including:
  (1) a step hinge rod extending transversely across said link means step end; and
  (2) a receiver extending transversely across said step means proximate end and rotatably receiving said step hinge rod.

2. The invention of claim 1, wherein:
 (a) said step means includes a retracted position adjacent to said link means and an extended position projecting from said link means step end.

3. The invention of claim 2, wherein:
 (a) said step means is pivotable through an arc of approximately 90 degrees between its retracted and extended positions.

4. The invention of claim 3, wherein:
 (a) said step hinge means includes stop means for restraining said step means in a range of movement between its retracted and extended positions.

5. A folding step system, which includes:
 (a) a base assembly having:
  (1) a proximate end;
  (2) a distal end;
  (3) an upper surface; and
  (4) a lower surface;
 (b) a link assembly having:
  (1) a base end;
  (2) a step end; and
  (3) a transversely-spaced pair of longitudinal members extending between said base and step ends;
 (c) a step assembly having:
  (1) a proximate end;
  (2) a distal end; and
  (3) opposite ends;
 (d) base hinge means for hingedly interconnecting said base proximate end and said link base end for rotation through an arc of movement about a transverse rotational axis between a retracted position adjacent to said base assembly and an extended position extending from said base assembly proximate end, said base hinge means including a pair of hooks on one of said base assembly and said link assembly defining an open receiver; and
 (e) step hinge means for rotatably interconnecting said link assembly step end and said step proximate end for rotation about a transverse rotational axis through an arc of movement between a retracted position adjacent to said link assembly and an extended position extending from the step end thereof.

6. A folding step system, which comprises:
 (a) base means including proximate and distal ends;
 (b) link means including base and step ends;
 (c) step means including proximate and distal ends;
 (d) base hinge means hingedly connecting said base proximate end and said link base end, said base hinge means including a base hinge rod extending transversely across said link base end;
 (e) step hinge means hingedly connecting said link step end and said step proximate end, said step hinge means including a trunion hinge assembly; and (f) a receiver extending transversely across said base proximate end, said receiver rotatably receiving said base hinge rod.

7. A folding step system, which comprises:
(a) base means including proximate and distal ends;
(b) link means including base and step ends;
(c) step means including proximate and distal ends;
(d) base hinge means hingedly connecting said base proximate end and said link base end;
(e) step hinge means hingedly connecting said link step end and said step proximate end;
(f) said link means being pivotal about said base hinge means through an arc of movement between a retracted position adjacent to said base means and an extended position extending from said base means proximate end; and
(g) said base hinge means including stop means for restraining the movement of said link means between its retracted and extended positions, said stop means including a flange depending downwardly from said base proximate end, said flange being impinged by said link means in its extended position.

8. A folding step system, which includes:
(a) a base assembly having:
    (1) a proximate end;
    (2) a distal end;
    (3) an upper surface; and
    (4) a lower surface;
(b) a link assembly having:
    (1) a base end;
    (2) a step end; and
    (3) a transversely-spaced pair of longitudinal members extending between said base and step ends;
(c) a step assembly having:
    (1) a proximate end;
    (2) a distal end; and
    (3) opposite ends;
(d) base hinge means for hingedly interconnecting said base proximate end and said link base end for rotation through an arc of movement about a transverse rotational axis between a retracted position adjacent to said base assembly and extended position extending from said base assembly proximate end;
(e) step hinge means for rotatably interconnecting said link assembly step end and said step proximate end for rotation about a transverse rotational axis through an arc of movement between a retracted position adjacent to said link assembly and an extended position extending from the step end thereof;
(f) said base assembly including opposite side walls associated with said base hinge means;
(g) said step assembly including opposite side walls; and
(h) with said step assembly in its retracted position and said link assembly in its retracted position, each said step side wall being positioned between a respective base assembly side wall and a respective longitudinal member.

9. The invention of claim 1, wherein:
(a) said link means is pivotable about said base hinge means through an arc of movement between a retracted position adjacent to said base means and an extended position extending from said base means proximate end.

10. The invention of claim 9, wherein:
(a) said link means is pivotable through an arc of movement of approximately 270 degrees.

11. The invention of claim 1 wherein said base hinge means includes a transversely-spaced pair of hooks at said base proximate end and a base hinge rod at said link means base end, each said hook forming a receiver for said base hinge rod.

12. The invention of claim 9 wherein said base hinge means includes:
(a) stop means for restraining the movement of said link means between its retracted and extended positions.

13. The invention of claim 12 wherein:
(a) said stop means includes:
    (1) a flange depending downwardly from said base proximate end, said flange being impinged by said link means in its extended position.

14. The invention of claim 13 wherein:
(a) said link means includes:
    (1) a pair of transversely-spaced, generally parallel longitudinal members extending between said base and step ends.

15. The invention of claim 6, wherein said step hinge means includes:
(a) a step hinge rod extending transversely across said link means step end; and
(b) a receiver extending transversely across said step means proximate end and rotatably receiving said step hinge rod.

16. The invention of claim 6, wherein said step hinge means includes a channel member extending transversely across said step means proximate end and forming said receiver.

17. The invention of claim 5, wherein said step hinge means includes:
(a) a trunnion hinge assembly.

18. The invention of claim 17 wherein:
(a) said base hinge means includes:
    (1) a base hinge rod extending transversely across said link base end; and
(b) a receiver extending transversely across said base proximate end, said receiver rotatably receiving said base hinge rod.

* * * * *